June 27, 1967
R. A. ADEE
3,327,787
DISC HARROW
Filed March 31, 1965
2 Sheets-Sheet 2
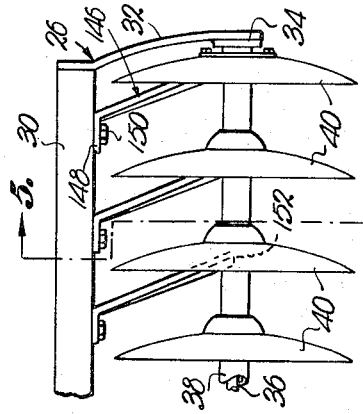
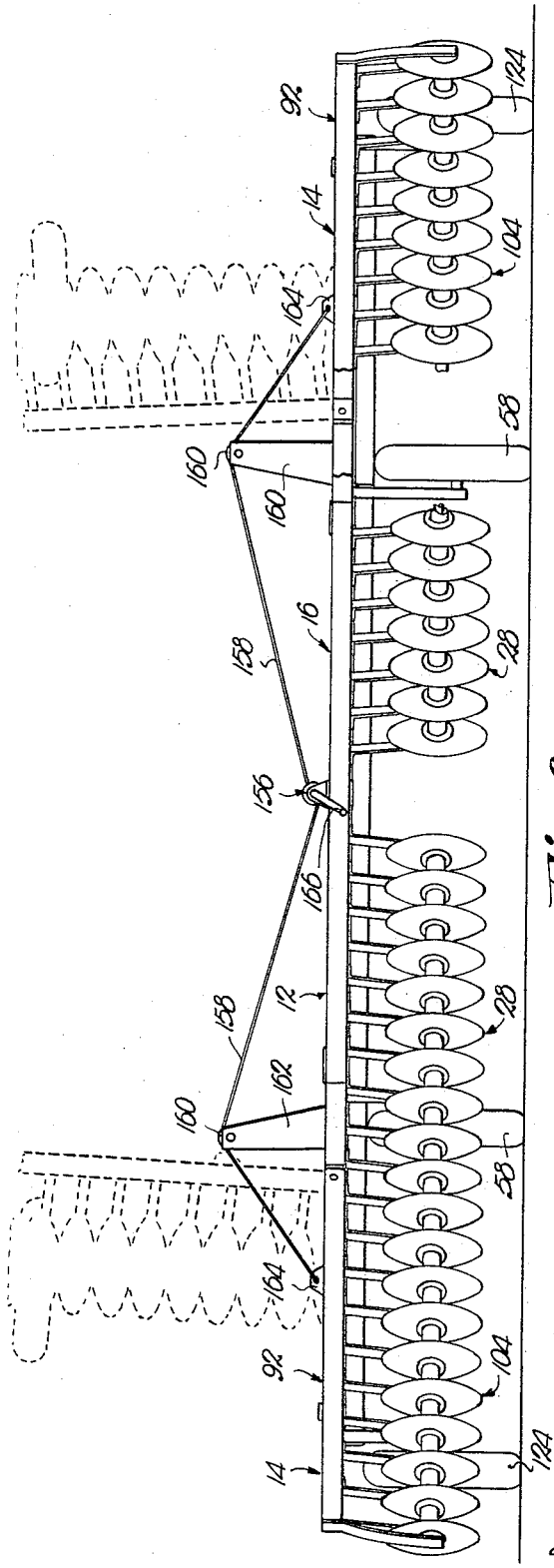
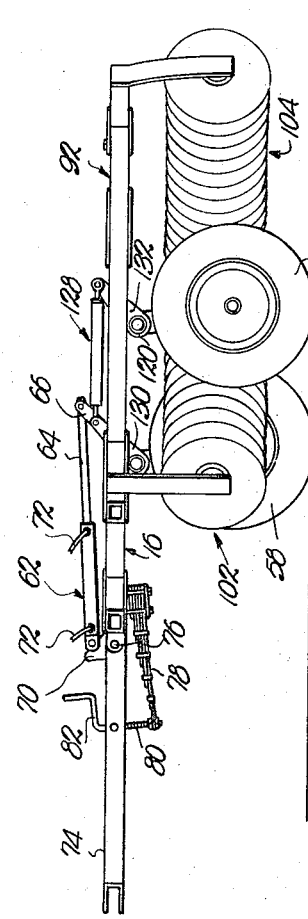
INVENTOR.
Raymond A. Adee
BY
Hovey, Schmidt, Johnson & Hovey
ATTORNEYS.

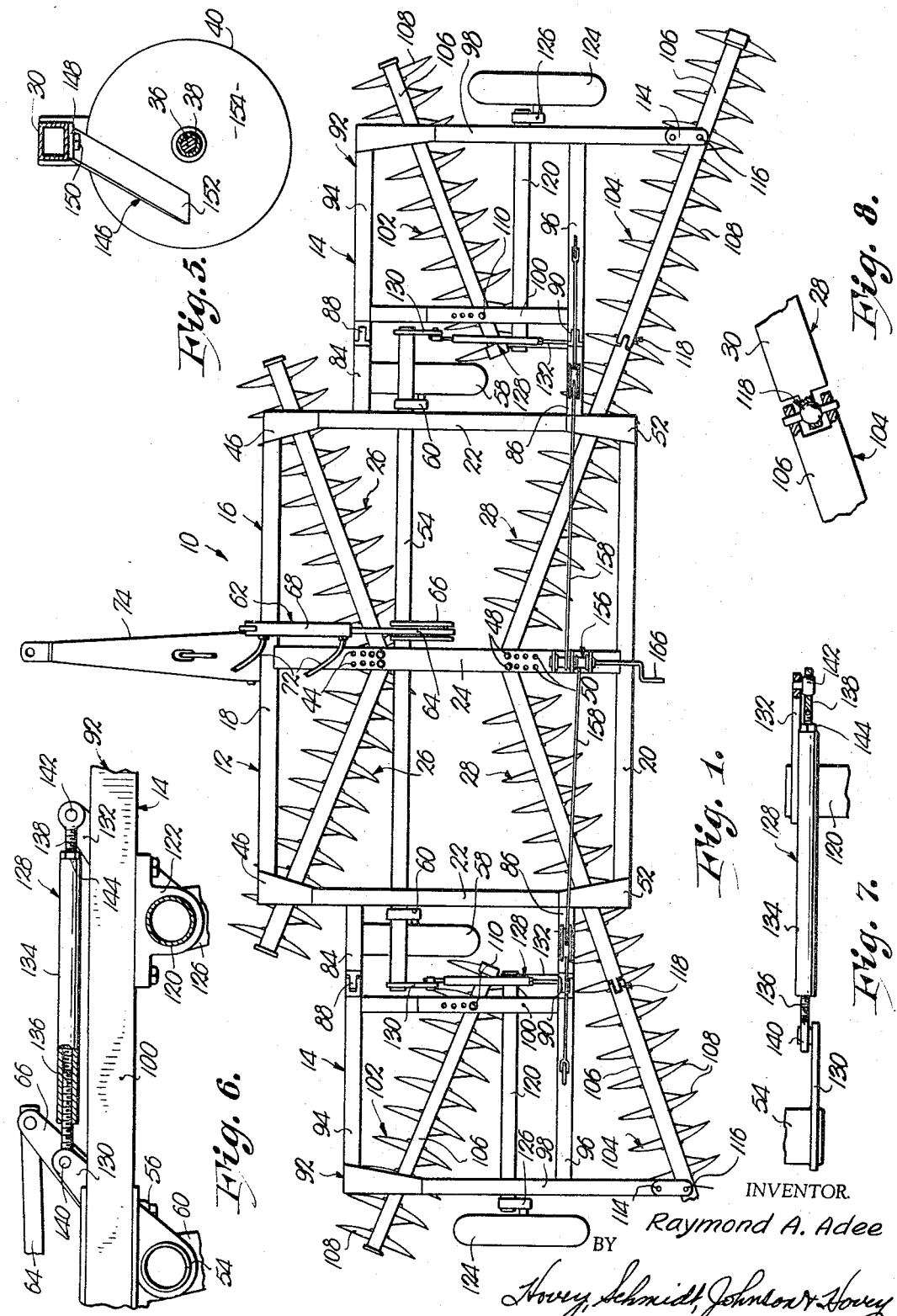

United States Patent Office 3,327,787
Patented June 27, 1967

3,327,787
DISC HARROW
Raymond A. Adee, Newton, Kans., assignor to Kewanee Machinery & Conveyor Company, Kewanee, Ill., a corporation of Illinois
Filed Mar. 31, 1965, Ser. No. 444,246
17 Claims. (Cl. 172—311)

This invention relates to improvements in disc harrows and, more particularly, to an improved disc harrow having hinged harrow sections at the side thereof to provide lateral extensions therefor.

Conventional disc harrows having hinged harrow sections at the sides thereof are generally limited in transverse width because the sections are unwieldy and difficult to raise and lower with respect to the ground. Moreover, the functional performance of these sections in the field is somewhat limited on uneven terrain because of their construction and the way in which they are mounted on the main frame of the disc harrow. Also, such sections do not have ground-engaging wheels thereon capable of accurately regulating the depth of cut of the discs carried by the sections as the latter move over uneven terrain. Each of the sections on a disc harrow of the type described, in addition, requires its own manual lifting structure to further complicate the construction of the harrow itself.

The present invention provides a disc harrow which overcomes the limitations of conventional harrows through the use of hinged, vertically swingable harrow sections of improved construction, capable of following the irregular terain while accurately regulating the depth of cut of the discs thereof, and being effectively coupled with the main frame of the harrow in a manner so as to require only a single lifting device for a pair of sections at opposed sides of the main frame. By virtue of these sections, the disc harrow of this invention may be constructed to attain transverse widths greater than the maximum widths now attainable with conventional disc harrows. Also, the hinged sections of this invention may be more effectively controlled for different terrains than is capable with the hinged ecstions of conventional disc harrows.

It is, therefore, the primary object of the instant invention to provide an improved disc harrow of the type having hinged, vertically swingable harrow sections providing lateral extensions therefor, wherein the sections are of a simple and rugged construction to permit an increase in the operating width of the harrow with respect to conventional harrows, while at the same time, the sections are free of the characteristics of the sections on conventional harrows which render the same unwieldy, difficult to manage, and incapable of accurately regulating the depth of cut of the discs thereof.

Another object of this invention is the provision of a disc harrow of the type described which requires only a single lifting device for raising and lowering a pair of harrow sections on opposed sides of the main frame of the harrow to thereby simplify the construction and operation thereof.

Yet another object of this invention is the provision of a disc harrow of the aforesaid character wherein a pair of hinged sections of the harrow may be constructed in a manner such that the front-to-rear spacing of a pair of disc gangs carried by each section is minimized, and the inner ends of the gangs on each section may be in close proximity to the outer ends of corresponding disc gangs on the main frame of the harrow, whereby the sections follow the main frame over uneven terrain and ridges between the gangs of the main frame and those of the sections are substantially eliminated.

A further object of this invention is the provision of a harrow section for hinged connection with the main frame of a disc harrow wherein is provided a wheel and axle assembly on the section which can be adjusted for depth control and is adapted to be coupled to the wheel and axle assembly of the main frame whereby the operative positions of the disc gangs of each section with respect to the main frame may be varied and the wheel and axle assemblies of the main frame and sections of the harrow may be operated simultaneously from a single source of power.

Still a further object of this invention is the provision of improved scraper structure for each disc of the hinged sections of a disc harrow wherein the structure includes a blade rigidly secured directly to and extending downwardly from the box beam forming the upper support for a gang of discs so as to simplify the construction of the gange itself and to eliminate or at least substantially minimize any tendency for trash and the like to accumulate thereon in the vicinity of the blades thereof as occurs with the use of secondary connecting structure required with scraper blades of conventional disc harrow equipment.

In the drawings:

FIGURE 1 is a top plan view of the improved disc harrow of this invention;

FIG. 2 is a rear elevational view thereof showing the gangs of discs on the main frame and side sections disposed above ground level by the ground-engaging wheels of these sections;

FIG. 3 is a side elevational view of the harrow with the discs thereof in the positions shown in FIG. 2;

FIG. 4 is an enlarged, fragmentary, side elevational view of a gang of discs illustrating the disposition of a scraper blade for each disc respectively;

FIG. 5 is a cross-sectional view taken along line 5—5 of FIG. 4;

FIG. 6 is an enlarged, fragmentary, side elevational view of the disc harrow illustrating the coupling device interconnecting the wheel and axle assemblies of the main frame and one of the side sections;

FIG. 7 is a top plan view of the structure of FIG. 6; and

FIG. 8 is an enlarged, fragmentary, top plan view of the junction between the outer end of one of the rear disc gangs of the main frame and the inner end of the rear disc gang of the corresponding side section.

A preferred embodiment of the disc harrow of this invention is illustrated in FIG. 1 and is denoted by the numeral 10. Disc harrow 10 comprises a main section 12 and a pair of side sections 14 hingedly secured to section 12 for vertical swinging movement with respect thereto.

Section 12 is conventional in construction and includes a rectangular frame 16 comprised of a front, transverse member 18, a rear, transverse member 20, a pair of side members 22, and a central member 24 parallel with members 22. A pair of front disc gangs 26 are coupled with central member 24 and respective side members 22. Similarly, a pair of rear disc gangs 28 are coupled to central member 24 and side members 22. Each of the disc gangs 26 and 28 comprises a box beam 30 having a pair of downwardly extending brackets 32 thereon at the ends thereof, a bearing 34 at the lower end of each bracket 32 for rotatably mounting a respective end of a shaft 36 telescoped within and rotatable with respect to a tube 38 carrying a plurality of axially spaced discs 40.

Gangs 26 are adjustably mounted on frame 16 by virtue of pins 42 receivable within spaced, longitudinally aligned holes 44 in central member 24, beams 30 of gangs 26 being shiftable adjacent their outer ends thereof within passages (not shown) formed by upper and lower, parallel plates 46 at the junctions of member 18 and members 22. Similarly, rear gangs 28 are adjustable at their inner ends by virtue of pins 48 receivable within spaced, longitudinally aligned holes 50 in central member 24, there being upper and lower plates 52 at the junctions of member 20 and members 22 to define passages which shiftably receive box beams 30 of gangs 28. Each pair of plates 52 as provided with spaced, aligned holes 53, as shown in FIG. 1, for receiving a pin 55 which limits the rearward movement of the corresponding gang 28. A change of position of the inner end of each gang 28 will generally require a change in position of the outer end thereof in order to maintain gang 28 substantially coextensive with a corresponding rear disc gang on the adjacent section to be hereinafter described. Thus, for example, movement of pins 48 rearwardly and into another hole 50 will necessitate a corresponding change in hole 53. Gangs 26 and 28 at each side of main frame 16 are relatively divergent as their outer ends are approached.

An axle 54 carried by bearings 56 secured to the underside of members 22 is rotatable with respect to frame 16 for raising and lowering a pair of ground-engaging wheels 58 carried by axle 54 by legs 60. A piston and cylinder assembly 62 has a piston rod 64 pivotally coupled at the outer end thereof to an arm 66 which, in turn, is rigidly secured to axle 54 for rotating the latter in opposed directions in response to the reciprocation of rod 64 with respect to cylinder 68 of assembly 62, cylinder 68 being pivotally secured to an ear 70 on member 18. Fluid pressure and return lines 72 are coupled with cylinder 68 and are adapted to be operably coupled with a source of fluid under pressure.

A tongue 74 is pivotally mounted by means of a pin 76 to member 18 and is adapted to be operably coupled to a tractor or the like for moving harrow 10 over the ground in a forward direction. A leaf spring 78, secured at one end thereof to frame 16, biases tongue 74 into the position shown in FIG. 3. A screw 80 having a crank 82 thereon is pivotally coupled to tongue 74 and to the forward end of spring 78 for shifting tongue 74 with respect thereto.

Each member 22 has a pair of longitudinally spaced, lateral extensions 84 and 86 thereon having hinges 88 and 90 respectively at the outer ends thereof for swingably mounting the corresponding side section 14 on the respective side member 22. Hinges 88 and 90 define an axis which is substantially parallel to the normal path of travel of harrow 10.

Each side section 14 includes a side frame 92 having a front member 94 aligned with extension 84 and coupled thereto by hinge 88. Side frame 92 further includes a rear member 96 aligned with extension 86 and coupled therewith by means of hinge 90. A pair of side members 98 and 100 span the distance between members 94 and 96, member 98 extending rearwardly from member 96 as illustrated in FIG. 1.

A pair of front and read disc gangs 102 and 104 are provided for each side frame 92 respectively. Gangs 102 and 104 are substantially of the same construction as gangs 26 and 28 inasmuch as each of the gangs 102 and 104 includes a box beam 106 to which a number of axially spaced discs 108 are secured in the manner shown in FIG. 4.

Gang 102 spans the distance between members 98 and 100 and projects outwardly from frame 92 a short distance as shown in FIG. 1. The inner end of gang 102 is adjustably secured to member 100 by a pin 110 in the manner described above with respect to the inner ends of gangs 26 and 28. Similarly, gang 102 is shiftably coupled adjacent the outer end thereof with side frame 92 by virtue of a pair of vertically spaced, substantially parallel plates 112 which join members 94 and 98. Gang 102 is preferably parallel with the adjacent gang 26 and extends inwardly from member 100 a short distance so that the innermost disc 108 moves over a path adjacent to the path of travel of the outermost disc 40 of the adjacent gang 26. Thus, no ridge will be formed between the paths of travel of gangs 26 and 102.

Rear gang 104 is pivotally secured adjacent the outer end of the member 106 thereof by a pair of vertically spaced, generally parallel plates 114, there being a pin 116 pivotally interconnecting plates 114 and beam 106 of gang 104. The inner end of beam 106 of gang 104 is bifurcated as shown in FIG. 6 and is pivotally coupled to the outer end of the beam 30 of the corresponding rear gang 28 by a universal joint 118 as shown in FIG. 8. To accommodate universal joint 118, the bracket adjacent to the inner end of gang 104 for connecting beam 106 with discs 108 thereof is secured to the underside of beam 106 and extends downwardly therefrom. Thus, the discs are effectively supported for engagement with the ground notwithstanding the presence of universal joint 118 on gang 104.

The innermost disc 108 of gang 104 is in relatively close proximity to the outermost disc 40 of the corresponding gang 28 so that gang 104 forms a substantial continuation of gang 28. Gangs 102 and 104 are relatively divergent as their outer ends are approached. Moreover, gang 102 is disposed on side frame 92 so that the distance between the outer ends of gangs 102 and 104 is substantially equal to the distance between the outer ends of the corresponding gangs 26 and 28.

An axle 120 is rotatably mounted on the undersides of members 98 and 100 by a pair of bearings 122, and a ground engaging wheel 124 is coupled by a leg 126 to axle 120 so that rotation of the latter in opposed directions causes wheel 124 to raise and lower with respect to the ground.

The inner end of axle 120 is coupled to the outer end of axle 54 by a coupling device 128 comprised of laterally extending arms 130 and 132 on axles 54 and 120 respectively, there being a coupling element 134 interconnecting the outer ends of arms 130 and 132.

Element 134 has a pair of internally threaded bores at the ends thereof for threadably receiving screws 136 and 138 respectively, screws 136 being pivotally coupled by pivot structure 140 to arm 130, and screw 138 being pivotally coupled by pivot structure 142 to arm 132. A nut 144, carried by screw 138, engages the end face of element 134 to thereby hold screw 138 against movement into element 134. Pivot structures 140 and 142 are self-aligning to a limited degree so that screws 136 and 138 are axially rotatable in opposed directions through a limited arc with respect to arms 130 and 132 respectively.

Coupling device 128 provides structure whereby axle 120 of each side frame 92 is rotatable with axle 54 relative to main frame 16. In addition, device 128 permits vertical swinging movement of axle 120 with the corresponding side frame 92 inasmuch as element 134 rotates about screw 136 through an angle approximating 90° as side frame 92 rotates from the full-line position thereof shown in FIG. 2, to the dashed-line position. Element 134 rotates in the opposite direction as the corresponding side frame 92 is lowered.

Screws 136 and 138, in cooperation with element 134 and nut 144, permit adjustments to be made in the operative position of wheel 124 with respect to the corresponding wheel 58. By selectively positioning screws 136 and 138 in the respective bores of element 134, the linear distance between the outer ends of arms 130 and 132 may be varied to thereby permit control of the depth to which discs 108 of gangs 102 and 104 penetrate the ground as harrow 10 is advanced forwardly in the usual manner. To accomplish this, it is preferred that one of the screws coupled with element 134 be provided with right-hand threads, and the other screw be provided with lefthand threads. Thus, rotation of element 134 relative to screws 136 and 138 will increase the distance between the outer ends of arms 130 and 132; whereas, rotation of element 134 in the opposite direction will decrease this distance.

Harrow 10 is provided with improved structure for scraping the discs of the various gangs thereof, and to this end, each gang is provided with a plurality of scraper blades 146, there being a blade 146 for each disc respectively. As illustrated in FIGS. 4 and 5, each blade 146 has a flange 148 which is secured to the underside of beam 30 by a bolt 150, the major portion of blade 146 extending downwardly from flange 148 at an angle with respect to beam 30. Each blade 146 is transversely arcuate adjacent to the lowermost extremity thereof and terminates in an arcuate, lowermost edge 152 which is in scraping relationship with the concave face 154 of the corresponding disc 40. The length of edge 152 is sufficient to effectively remove substantially all soil adhering to face 154, edge 152 being substantially horizontally aligned with shaft 136 and disposed at one side of the latter as illustrated in FIG. 5. Thus, flange 148 of each blade 146 extends outwardly therefrom at an angle with respect to its longitudinal axis. Blades 146 may be releasably coupled with beam 30 by bolts 150 to permit replacement of the blades as required.

Means for raising and lowering side sections 14 with respect to main section 12 includes a winch 156 carried on central member 24 adjacent to member 20. A pair of cables 158 are wrapped about winch 156 and extend outwardly therefrom, over sheaves 160 carried on supports 162 secured to and extending upwardly from respective extensions 86. The outer ends of cables 158 are secured to ears 164 rigid to and extending upwardly from respective members 96 as shown in FIGS. 1 and 2. A crank 166 coupled with winch 156 rotates the latter in opposed directions to simultaneously raise and lower side sections 14 with respect to main section 12.

In operation, side sections 14 are initially in the dashed-line positions thereof shown in FIG. 2, with wheels 58 engaging the ground and gangs 26 and 28 spaced above the ground. Tongue 74 is coupled to a tractor or the like and moved over the ground to a working site.

When harrow 10 is ready for operation, winch 156 is rotated to lower sections 14 so that the same provide lateral extensions for main section 12. Assembly 62 is actuated to elevate wheels 58 and 124 so that the discs of gangs 26, 28, 102 and 104 engage the ground to the proper depth. Harrow 10 is then moved forwardly over the ground and the discs of the various gangs work the soil in the usual manner. It is assumed that the depth adjustment of gangs 102 and 104 has been made prior to the operation of harrow 10. This is accomplished by setting the devices 128 in the manner described above.

As sections 14 move over irregular terrain, the soil is effectively worked, inasmuch as the spacing between the outer ends of gangs 102 and 104 is substantially equal to that between gangs 26 and 28. In addition, there are no open furrows between main section 12 and side sections 14 by virtue of the dispositions of the various gangs of discs thereof. Hinges 88 and 90 and universal joint 118 corresponding with each side section 14, permits downward, as well as upward movements of the corresponding side frame 92 so that the soil will be effectively worked, regardless of the irregularity of the terrain over which harrow 10 passes. The alignment of each gang 104 with the corresponding gang 28 assures that no trash will pass therebetween, such as will occur between the gangs of conventional harrow equipment. Moreover, the connection of the outer end of each gang 28 with the inner end of the corresponding gang 104, permits greater ease of manipulation of the corresponding side section with respect to main section 12 inasmuch as side section 14 is not as unwieldy and difficult to manage as the hinged side sections of conventional harrows. As a result, sections 14 are able to increase the effective operative width of harrow 10 over that of harrows presently in use and greater areas may be worked in a given length of time.

Universal joints 118 permit gangs 104 to swing vertically with corresponding frames 92 notwithstanding the angularity of gangs 104 with respect to the axis of swinging movement of side frames 92. It is to be noted that joints 118 lie on the axis of swinging movement of corresponding side frames 92.

The operator of harrow 10 has control of the depth of penetration of gangs 26, 28, 102 and 104 at all times inasmuch as assembly 62 may be selectively actuated from a remote location even during movement of harrow 10 over the ground. Since devices 128 couple axle 54 with axles 120, wheels 124 are simultaneously moved with wheels 58.

During operation of harrow 10, blades 146 effectively scrape soil from the adjacent discs. Thus, the discs are cleaned during operation to prevent the build-up of soil thereon. It is assumed, of course, that blades 146 are provided for gangs 102 and 104, as well as for gangs 26 and 28. Upon completion of the soil-working operation, wheels 58 are swung downwardly to raise gangs 26 and 28 above the ground. Also, side sections 14 are swung to the dashed-line positions of FIG. 2 thereof by rotation of winch 156. In this connection, harrow 10 may be moved over a roadway from one site to another.

Having thus described the invention, what is claimed as new and desired to be secured by Letters Patent is:

1. In a disc harrow:
   a main frame having a side;
   a wheel and axle assembly coupled with said main frame at a location thereon to support the same for movement over the ground;
   a pair of spaced disc gangs carried by said main frame and being disposed thereon transversely of the path of travel thereof, said gangs being relatively divergent as the outer ends thereof are approached, said outer ends of the gangs being disposed adjacent to said side of the main frame;
   a side frame hingedly mounted on said side of the main frame for vertical swinging movement with respect thereto; and
   a pair of spaced disc gangs carried by said side frame for movement therewith, being disposed transversely of said path, and being relatively divergent as the outer ends thereof are approached, the distance between the outer ends of the gangs of said side frame being substantially equal to the distance between the outer ends of the gangs of said main frame, the rear gang of said side frame being in substantial axial alignment with the rear gang of said main frame.

2. In a disc harrow as set forth in claim 1, wherein said side frame is provided with a wheel and axle assembly, the axle of the last-mentioned assembly being rotatably mounted on said side frame and parallel with the axle of said assembly of said main frame, and means for rotating the axle of said side frame to thereby raise and lower the wheel thereof.

3. In a disc harrow as set forth in claim 2, wherein is provided a coupling unit interconnecting the axles of said assemblies, the axle of said main frame being rotatable therein, said rotating means including drive structure carried by said main frame and coupled with the axle thereof for rotating the same and thereby said axle of the side frame.

4. In a disc harrow as set forth in claim 3, wherein said coupling unit includes a pair of arms secured to and extending laterally from respective axles, and a coupling device interconnecting the outer ends of the arms, said coupling device having relatively shiftable parts to permit vertical swinging movement of said side frame relative to said main frame as said axles remain connected together by said unit.

5. In a disc harrow as set forth in claim 4, wherein said coupling device includes an elongated element having an internally threaded bore in each end thereof respectively and a screw for each bore respectively, the screws being threadably coupled to said element within respective bores and pivotally secured to the outer ends of respective arms.

6. In a disc harrow as set forth in claim 5, wherein is provided pivot structure pivotally connecting each screw respectively with the respective arm, said structures being self-aligning to prevent damage to the coupling unit as said side frame swings relative to the main frame.

7. In a disc harrow as set forth in claim 5, wherein is provided a nut carried by one of the screws and normally engaging said element to limit inward movement of said one screw relative to said element whereby said element rotates with said one screw relative to the other screw as said side frame rotates relative to said main frame.

8. In a disc harrow as set forth in claim 3, wherein said coupling unit is substantially disposed in a vertical plane passing through the axis of swinging movement of said side frame.

9. In a disc harrow as set forth in claim 1, wherein the inner end of the rear gang of said side frame being pivotally connected to the outer end of the rear gang of said main frame, said gear gang of said side frame being pivotally coupled adjacent the outer end thereof to said side frame.

10. In a disc harrow as set forth in claim 3, wherein is provided a universal joint pivotally interconnecting the proximal ends of the rear gang of said side and main frames.

11. In a disc harrow as set forth in claim 1, wherein each of said gangs includes a beam and a plurality of spaced discs below said beam, and wherein is included a scraper blade for each disc respectively, each blade being secured to the corresponding beam, extending downwardly therefrom and angularly disposed with respect thereto in scraping relationship to the proximal face of the corresponding disc.

12. In a disc harrow as set forth in claim 11, wherein each disc is provided with a concave face, each scraper blade having an arcuate lowermost edge complemental to and in close proximity to the concave face of the corresponding disc.

13. In a disc harrow:
a main frame having a side;
a pair of spaced extensions secured to said side and projecting laterally therefrom;
a wheel and axle assembly coupled with said main frame at a location thereon to support the same for movement over the ground, said assembly including an axle rotatably mounted on said main frame and having an extremity adjacent to the outer extremities of said extensions;
a pair of spaced disc gangs carried by said main frame and being disposed thereon transversely of the path of travel thereof, said gangs being relatively divergent as the outer ends thereof are approached;
a side frame;
a pair of hinges mounting the side frame on the outer ends of said extensions for vertically swinging movement with respect to said main frame from a position extending laterally therefrom to a position extending upwardly therefrom;
a wheel and axle assembly coupled with said side frame at a location thereon to support the same for movement over the ground, said assembly of said side frame including an axle rotatably mounted thereon and being substantially parallel with the axle of said main frame when said side frame extends laterally from the main frame;
an arm for each axle respectively, the arms projecting laterally from respective axles;
a coupling device interconnecting the outer ends of said arms, said device including extensible structure to permit variation in the linear distance between the outer ends of said arms;
power means carried by said main frame and coupled with said axle thereof for rotating said axles simultaneously with respect to said main frame, whereby the wheels of said assemblies may be simultaneously raised and lowered when the side frame extends laterally from the main frame;
a pair of spaced disc gangs carried by said side frame for movement therewith, being disposed transversely of said path, and being relatively divergent as the outer ends thereof are approached, the distance between the outer ends of the gangs of said side frame being substantially equal to the disance between the outer ends of the gangs of said main frame, the rear gang of said side frame being in substantial axial alignment with the rear gang of said main frame, the rear gang of said side frame having an inner end and an outer end and being pivotally mounted adjacent the outer end thereof on said side frame; and
a universal joint pivotally connecting the inner end of the rear gang of said side section with the outer end of the rear gang of said main section, said universal joint being in alignment with said pair of hinges.

14. A disc harrow comprising:
a main frame having a pair of opposed sides;
a wheel and axle assembly coupled with said main frame at a location thereon to support the same for movement over the ground, said assembly including an axle rotatably mounted on said main frame;
a pair of spaced disc gangs on the main frame for each of the sides thereof respectively, each pair of disc gangs being disposed transversely of the path of travel of the main frame and being relatively divergent as the outer ends thereof are approached, said outer ends of each pair of gangs being disposed adjacent to the corresponding side of the main frame;
a side frame for each of said sides respectively, each side frame being hingedly mounted on the corresponding side for vertically swinging movement with respect thereto into and out of a position extending substantially laterally of said main frame;
a wheel and axle assembly for each side frame respectively, the assembly of each side frame being disposed at a location thereon to support the same when the side frame extends laterally from said main frame, the last-mentioned assembly including an axle rotatably mounted on the corresponding side frame and being offset from the axle of said main frame;
means interconnecting the axle of said main frame with the axle of each side frame respectively to permit rotating of the axles of the side frames in response to the rotation of the axle of the main frame;
a pair of spaced disc gangs for each side frame respectively, the disc gangs of each side frame being disposed transversely of said path, being relatively divergent as the outer ends thereof are approached and being connected to the corresponding side frame for movement therewith, the distance between the outer ends of the gangs of each side frame being substantially equal to the distance between the outer ends of each pair of gangs of said main frame, the rear gang of each side frame being in substantial axial alignment with the corresponding rear gang of the main frame;
means carried by said main frame and coupled with the axle of said main frame for rotating the same and thereby the axles of said side frames, whereby the wheels of said assemblies may be raised and lowered; and
means carried by said main frame for simultaneously raising and lowering said side frames.

15. In a disc harrow:
a disc gang having a beam, a plurality of spaced discs, and means mounting the discs in alignment below said beam;
a scraper blade for each disc respectively; and
means securing each blade to said beam, each blade extending downwardly from the beam and having a lowermost end in relatively close proximity to the proximal face of the corresponding disc in scraping relationship thereto.

16. In a disc harrow as set forth in claim 15, wherein each blade extends downwardly from said beam at an angle to thereby partially block the space between the corresponding disc and a disc adjacent thereto.

17. In a disc harrow as set forth in claim 15, wherein said face of each disc being concave, each blade having and arcuate lowermost edge complemental to the concave face of the corresponding disc.

References Cited
UNITED STATES PATENTS 3,193,023   7/1965   Adee _____ 172—311

ABRAHAM G. STONE, *Primary Examiner.*

J. R. OAKS, *Assistant Examiner.*